(12) United States Patent
Zeng et al.

(10) Patent No.: US 6,995,995 B2
(45) Date of Patent: Feb. 7, 2006

(54) DIGITAL LOOP FOR REGULATING DC/DC CONVERTER WITH SEGMENTED SWITCHING

(75) Inventors: James S. Zeng, Cupertino, CA (US); Sridhar Kotikalapoodi, Santa Clara, CA (US); Lajos Burgyan, Mountain View, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 10/726,723

(22) Filed: Dec. 3, 2003

(65) Prior Publication Data

US 2005/0122751 A1    Jun. 9, 2005

(51) Int. Cl.
*H02M 3/18* (2006.01)

(52) U.S. Cl. .......................................... 363/60; 327/536
(58) Field of Classification Search .................. 363/60, 363/59; 327/536
See application file for complete search history.

(56) References Cited

U.S. PATENT DOCUMENTS

| 6,512,411 B2 * | 1/2003 | Meng et al. ................. 327/536 |
| 6,657,875 B1 | 12/2003 | Zeng et al. | |

2002/0110009 A1    8/2002   Hiroyuki

FOREIGN PATENT DOCUMENTS

| EP | 1 237 265 | 9/2002 |
| GB | 2 231 804 | 8/1998 |
| WO | 2005/057765 | 6/2005 |

OTHER PUBLICATIONS

Texas Instruments TPS60500, "High Efficiency, 250-mA Step-Down Charge Pump," Oct. 2001—Revised Feb. 2002, pp. 1-19.
Linear Technology LTC3251, "500mA High Efficiency, Low Noise, Inductorless Step-Down DC/DC Converter," 2003, pp. 1-12.

* cited by examiner

*Primary Examiner*—Shawn Riley
(74) *Attorney, Agent, or Firm*—Sidley Austin Brown & Wood LLP (57) ABSTRACT

A power control circuit is provided containing a switch array, which includes segmented switches, a flying capacitor, an output voltage terminal, a feedback loop, and a digital voltage regulator block. The digital voltage regulator block includes an A/D converter, an encoder, an add-subtractor, and a gate logic. These power control circuits do not include pass transistors. A method is also provided, where the charge pumps of the power control circuit are operated in two-phase cycles including a charging phase and a pumping phase. The power control circuit is controlled in both of these phases, thereby reducing the ripple of the output voltage.

32 Claims, 6 Drawing Sheets

DIGITAL LOOP FOR REGULATING DC/DC CONVERTER WITH SEGMENTED SWITCHING

BACKGROUND

1. Field of Invention

The present invention generally relates to power supplies, and more particularly, to switched capacitor charge pump power supplies for generating a regulated output voltage different from the supply voltage.

2. Description of Related Art

Figure 1A:
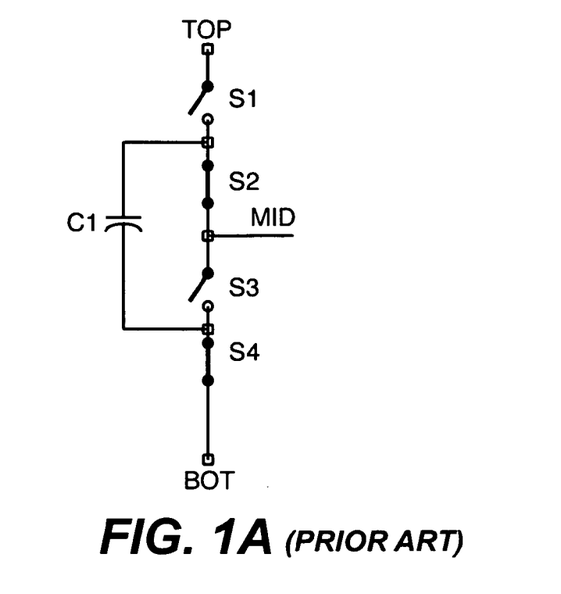
FIGS. 1A and B illustrate switch arrays.
Figure 1B:
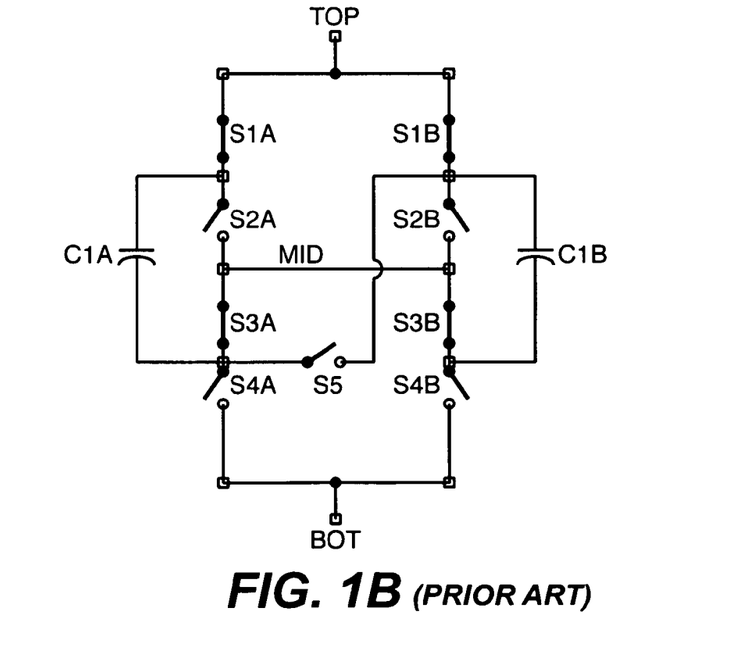

An unregulated switched capacitor DC/DC converter includes a switch array. FIG. 1A illustrates an existing converter topology. This converter utilizes one flying capacitor and four switches. FIG. 1B illustrates another existing topology with two flying capacitors and nine switches.

Figure 2:
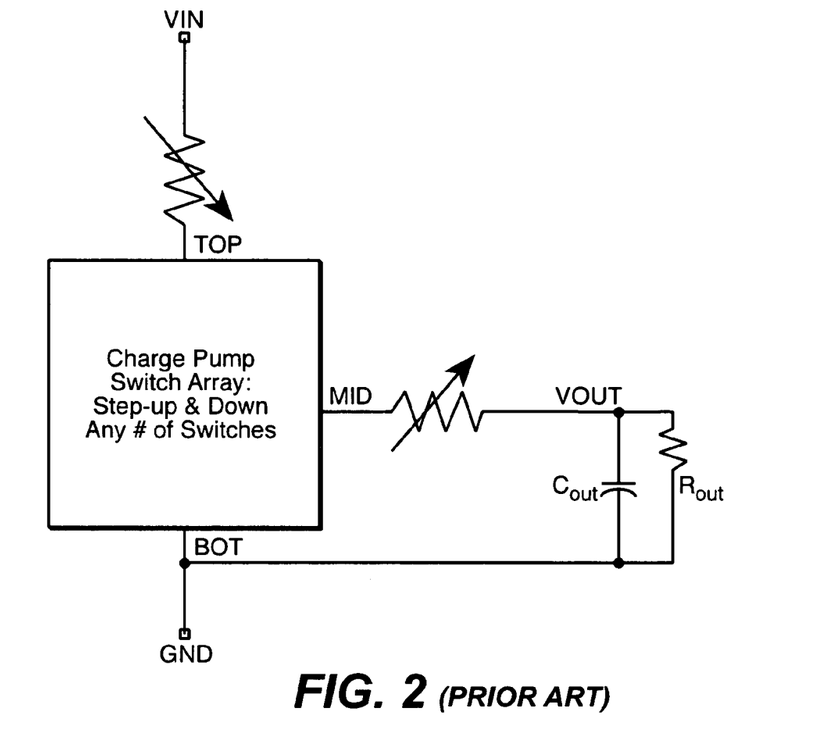
FIG. 2 illustrates a three terminal charge pump.

FIG. 2 illustrates a three terminal device that is equivalent to the switch array. By connecting the TOP, MID and BOT terminals with input, output, and ground in various combinations, step-up, step-down and inverter topologies are created.

Figure 3:
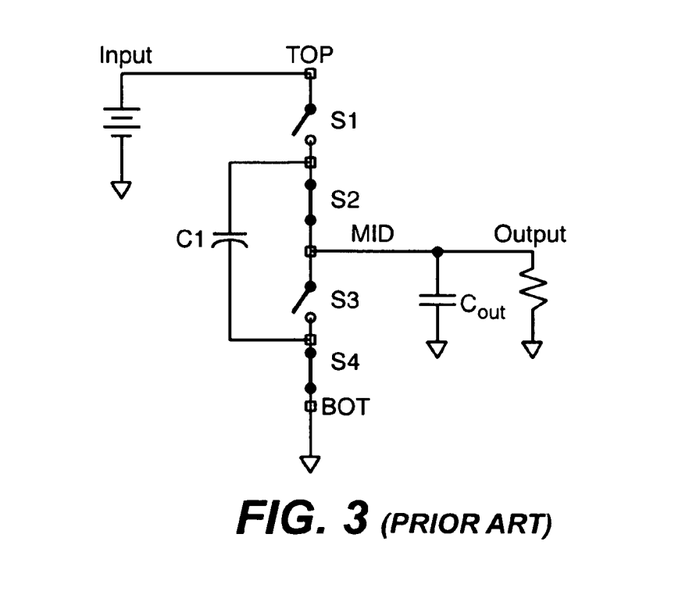
FIG. 3 illustrates a charge pump.

FIG. 3 illustrates a 2:1 step-down charge pump. Two-phase non-overlapping clocks are used to drive the switches. In phase 1, the charging phase, switches S1 and S3 are ON. Therefore, flying capacitor C1 is connected to an input supply voltage through the TOP terminal and charged. In phase 2, the pumping phase, flying capacitor C1 is connected to the output through the MID terminal. In this pumping phase the charge of flying capacitor C1 is transferred to an output capacitor $C_{out}$.

Charge pumps are regulated by various methods. In the method of hysteretic control a charge pump runs in a hysteretic mode. The hysteretic method can include pulse skipping, pulse frequency modulation, or the "bang-bang" process. The charge pump controls the output voltage into a voltage window. If the output reaches an upper threshold of the window, the oscillator of the circuitry is disabled and the power switches are turned OFF until the output voltage decreases to a value below a lower threshold. At this time the oscillator is enabled again and the switches are turned ON. This method can achieve high efficiency, especially in light load conditions. However, it can generate high current spikes and a large ripple in the output.

Another method to control charge pumps is called linear or analog control, or the $R_{dson}$ modulation. A charge pump with a linear control operates at an essentially constant frequency. The charge pump is regulated through the analog, i.e. continuous modulation of the resistance of the switches, which are ON. The linear control method is capable of producing low noise.

Figure 4:
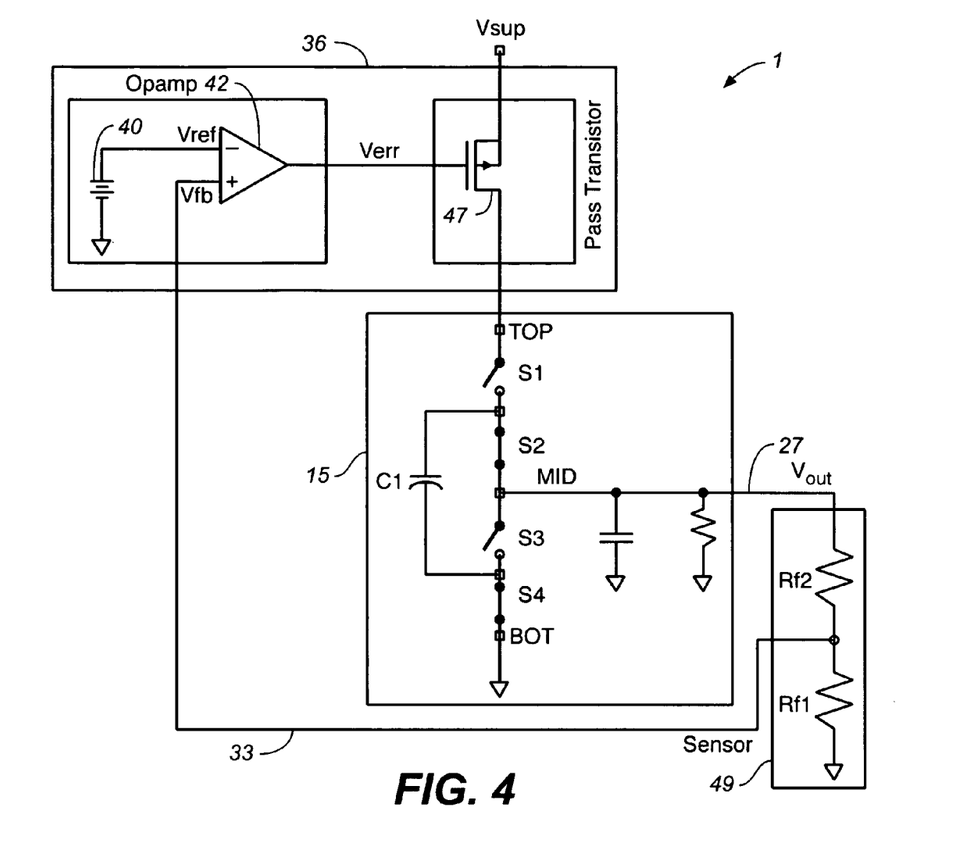
FIG. 4 illustrates a linear control loop.

FIG. 4 illustrates a charge pump with a linear control loop 1. Linear control loop 1 will be described in more detail later. In general, linear control loop 1 includes a charge pump 15 with TOP, MID, and BOT terminals, an output terminal 27 being coupled to the MID terminal. Linear control loop further includes a resistive voltage divider 49, connected to output terminal 27. A feedback voltage, generated by voltage divider 49 is coupled back to an operational amplifier, or opamp 42, which compares the feedback voltage and the reference voltage and generates an error signal at its output. The generated error signal is coupled into pass transistor 47, which is coupled between a power supply and the input TOP terminal of charge pump 15.

Some aspects of the charge pump of FIG. 4 are as follows. Pass transistor 47 is typically large and occupies valuable die area. Also, in the pumping phase the flow rate of charge from flying capacitor C1 to output capacitor $C_{out}$ is not controlled. Therefore, the ripple of the output voltage is not controlled and can be quite large. Further, the loop stability restricts the selection of the external output capacitor and its equivalent series resistance. The transient performance of the charge pump is limited by the bandwidth of the control loop and can be unsatisfactory. Finally, the dynamic losses associated with turning the switch array ON and OFF can be high.

SUMMARY

Briefly and generally, embodiments of the invention include a power control circuit containing a switch array, which includes switches, a flying capacitor and an output voltage terminal, providing an output voltage. In some embodiments at least one of the switches is a segmented switch. The power control circuit further includes a feedback loop, coupled to the output voltage terminal and a voltage regulator block, coupled to the feedback loop and to the switch array. The voltage regulator block regulates the output voltage.

In some embodiments of the power control circuit the voltage regulator block is a digital voltage regulator block. Digital embodiments include an A/D converter, an encoder, an arithmetic/logic unit, and gate logic.

Some embodiments of the power control circuit do not use pass transistors, thus saving die area.

Some embodiments of the invention include a method where the charge pumps are operated in two-phase cycles including a charging phase and a pumping phase. Some embodiments control the power control circuit in both of these phases, thereby reducing the ripple of the output voltage.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1–8. Like numerals are used for like and corresponding parts of the various drawings.

The structure and operation of power control circuits will be described in relation to analog power control circuit 1 of FIG. 4. Then various power control circuits 2 will be described according to embodiments of the invention in relation to FIGS. 5–8.

In power control circuit 1, the regulation of output voltage V_out is achieved in an analog manner by coupling a V_DD supply voltage into voltage regulator block 36. In power control circuit 1 voltage regulator block 36 regulates the fraction of the V_DD supply voltage, which reaches switch array 15.

Voltage regulator block 36 includes reference voltage supply 40, providing a predefined reference voltage V_ref. In some embodiment the value of reference voltage V_ref can be in the range of about 0.5V to 20V. Voltage regulator block 36 further includes an amplifier 42, coupled to a reference voltage supply 40 and a feedback loop 33. Amplifier 42 is configured to sense the difference between reference voltage V_ref, provided by reference voltage supply 40, and feedback voltage V_fb, provided by feedback loop 33. Amplifier 42 generates an error voltage V_err, representing whether V_ref or V_fb is greater. V_err is coupled into pass transistor 47. In the present power control circuit pass transistor 47 is a MOS-FET transistor.

Amplifier 42 is coupled to the gate of pass transistor 47. The V_DD supply voltage is coupled to the source of pass transistor 47. The drain of pass transistor 47 is coupled to switch array 15. Other embodiments achieve the regulation function with different couplings.

Depending on whether reference voltage V_ref or feedback voltage V_fb is higher, the V_err error voltage of amplifier 42 increases or decreases the gate voltage of pass transistor 47. Accordingly, pass transistor 47 exhibits a higher or lower conductance. The conductance of pass transistor 47 controls that what fraction of supply voltage V_DD reaches switch array 15. This is one mechanism by which voltage regulator block 36 regulates output voltage V_out of output voltage terminal 27.

Pass transistor 47 is coupled to switch array 15. In power control circuit 1 switch array 15 includes four switches, S1 . . . S4. Switches S1 . . . S4 are coupled in series between TOP and BOT terminals.

Output terminal 27 is coupled to MID node, located between switches S2 and S3. There are at least two capacitors in power control circuit 1. Flying capacitor C1 is coupled to a node between switches S1 and S2 and to a node between switches S3 and S4. Output capacitor C_out is coupled between output terminal 27 and the ground. The external load R_load is coupled between output terminal 27 and the ground.

Output terminal 27 is also coupled to a voltage divider 49. In power control circuit 1 voltage divider 49 includes two resistors R1 and R2. Feedback loop 33 is coupled between resistors R1 and R2, and senses a feedback voltage V_fb. For this two-resistor voltage divider the feedback voltage V_fb is a fraction of the output voltage V_out:

$$V\_fb = R1/(R1+R2) * V\_out$$

This V_fb feedback voltage is coupled back to amplifier 42 in voltage regulator block 36. As described above, the V_fb feedback voltage is utilized by voltage regulator block 36 to control pass transistor 47.

In power control circuit 1 voltage regulator block 36 controls pass transistor 47 for regulating the fraction of supply voltage coupled into switch array 15. Pass transistors typically occupy a large die area, thus requiring that the total area of the power chip be large as well. In some power control circuits a pass transistor may occupy as much as 10% of the chip area. In comparison, digital logic transistors may take up as little as 1/1000 of the area of a pass transistor. Further, modern lithographic technologies are more suited for the formation of circuits, where the various circuit elements have comparable sizes. Finally, when the gate voltage of the pass transistor opens the conducting channel only partially, the conductance of the pass transistor is still much below its fully conducting value. For this reason the pass transistor dissipates a large fraction of the power supplied by the voltage supply. Therefore, power control circuits with pass transistors lose a considerable fraction of the power due to heating and hence operate inefficiently.

Figure 5:
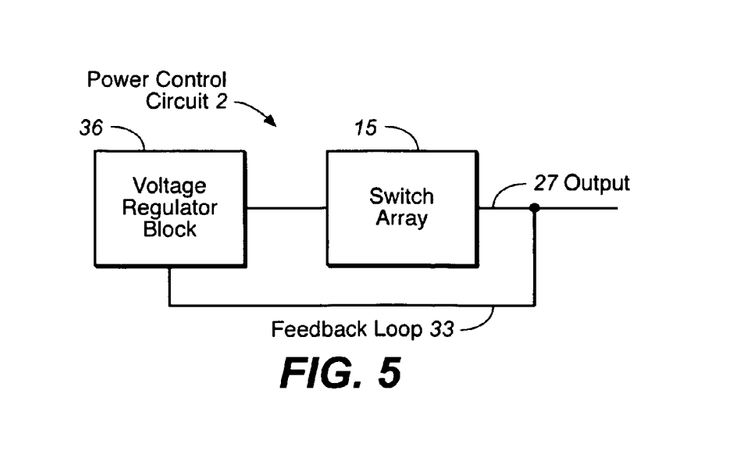
FIG. 5 illustrates a block diagram of a power control circuit according to an embodiment of the invention.

FIG. 5 illustrates a block diagram of a power control circuit 2 according to an embodiment of the invention. Power control circuit 2 includes a switch array 15. In some embodiments switch array 15 includes n switches SW1 . . . SWn, a flying capacitor C1, and an output voltage terminal 27. In some embodiments of power control circuit 2 at least one of the switches SW1 . . . SWn is a segmented switch, containing more than one switch-segment. Switch array 15 is also referred to as charge pump switch array.

Power control circuit 2 further includes a feedback loop 33, coupled to output voltage terminal 27 and to a voltage regulator block 36. Voltage regulator block 36 is also coupled to switch array 15. The functions of voltage regulator block 36 include regulating the output voltage V_out at output voltage terminal 27.

Figure 6:
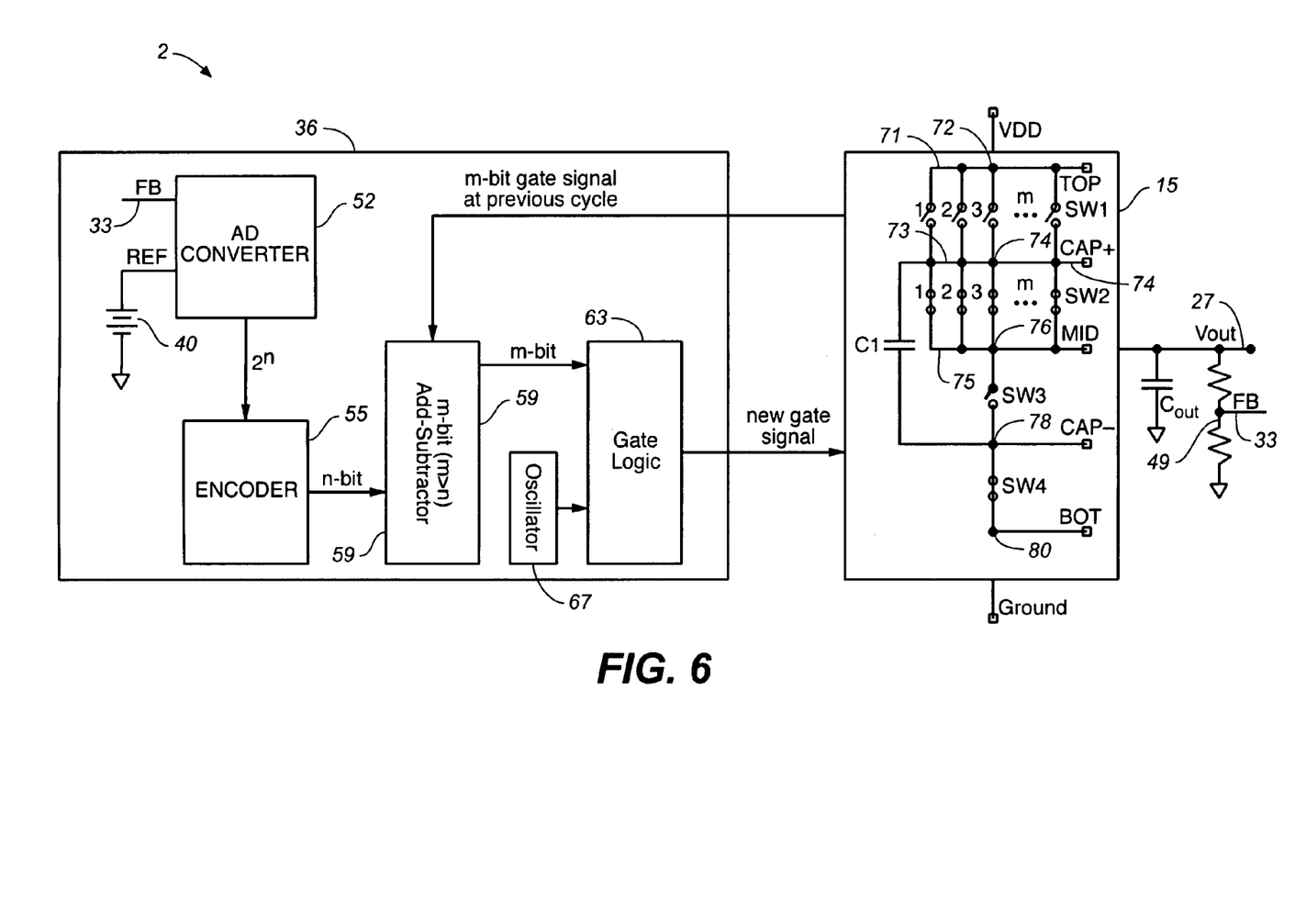
FIG. 6 illustrates a block diagram of a digital power control circuit according to embodiments of the invention.

FIG. 6 illustrates power control circuit 2 according to an embodiment of the invention. In this embodiment two switches SW1 and SW2 are segmented. Power control circuit 2 does not include a pass transistor, thus avoiding the above-described aspects related to the large relative size of pass transistors. In power control circuit 2 voltage regulator block 36 regulates the output voltage V_out by controlling the segments SW1-1 . . . SW1-$m$ and SW2-1 . . . SW2-$m$ of segmented switches SW1 and SW2.

Voltage regulator block 36 is a digital voltage regulator block. Voltage regulator block 36 includes an A/D converter 52. A/D converter 52 has reference voltage V_ref of reference voltage supply 40 coupled into it, as well as feedback voltage V_fb by feedback loop 33. A/D converter 52 senses the difference between reference voltage V_ref and feedback voltage V_fb. A/D converter 52 generates an error voltage V_err representing whether V_ref or V_fb is greater.

A/D converter 52 is coupled to encoder 55. Encoder 55 receives error voltage V_err and generates a digital error voltage V_err,d to represent V_err. In some embodiments the digital error voltage is n bit long. Encoder 55 couples digital error voltage V_err,d into an add-subtractor 59. Further, an m-bit sample-and-hold signal, corresponding to the gate signal of the previous cycle of the circuit is also coupled into add-subtractor 59, as described below. Add-subtractor 59 adds or subtracts the n-bit digital error voltage V_err,d and the m-bit sample-and-hold gate signal corresponding to whether V_fb or V_ref was greater. In embodiments of power control circuit 2 m is greater than n.

The digital add/subtract signal is coupled into a gate logic 63. Gate logic 63 is also coupled to an oscillator 67. Oscillator 67 is capable of generating a periodic signal with an essentially fixed period. Gate logic 63 generates a gate signal from the inputs it receives from add-subtractor 59 and oscillator 67. The gate signal will also be referred to as a switch control signal.

The gate signal is coupled into switch array 15. The gate signal controls switch-segments SW1-1 . . . SW1-$m$, SW2-1 . . . SW2-$m$, and switches SW3 and SW4. In other embodiments other switches, such as SW3 and SW4 can be segmented. In some embodiments more than two switches are segmented. In some embodiments more than four switches are employed. Next some details of switch array 15 will be described referring to FIG. 7 and the description of FIG. 6 will be completed afterwards.

Figure 7:
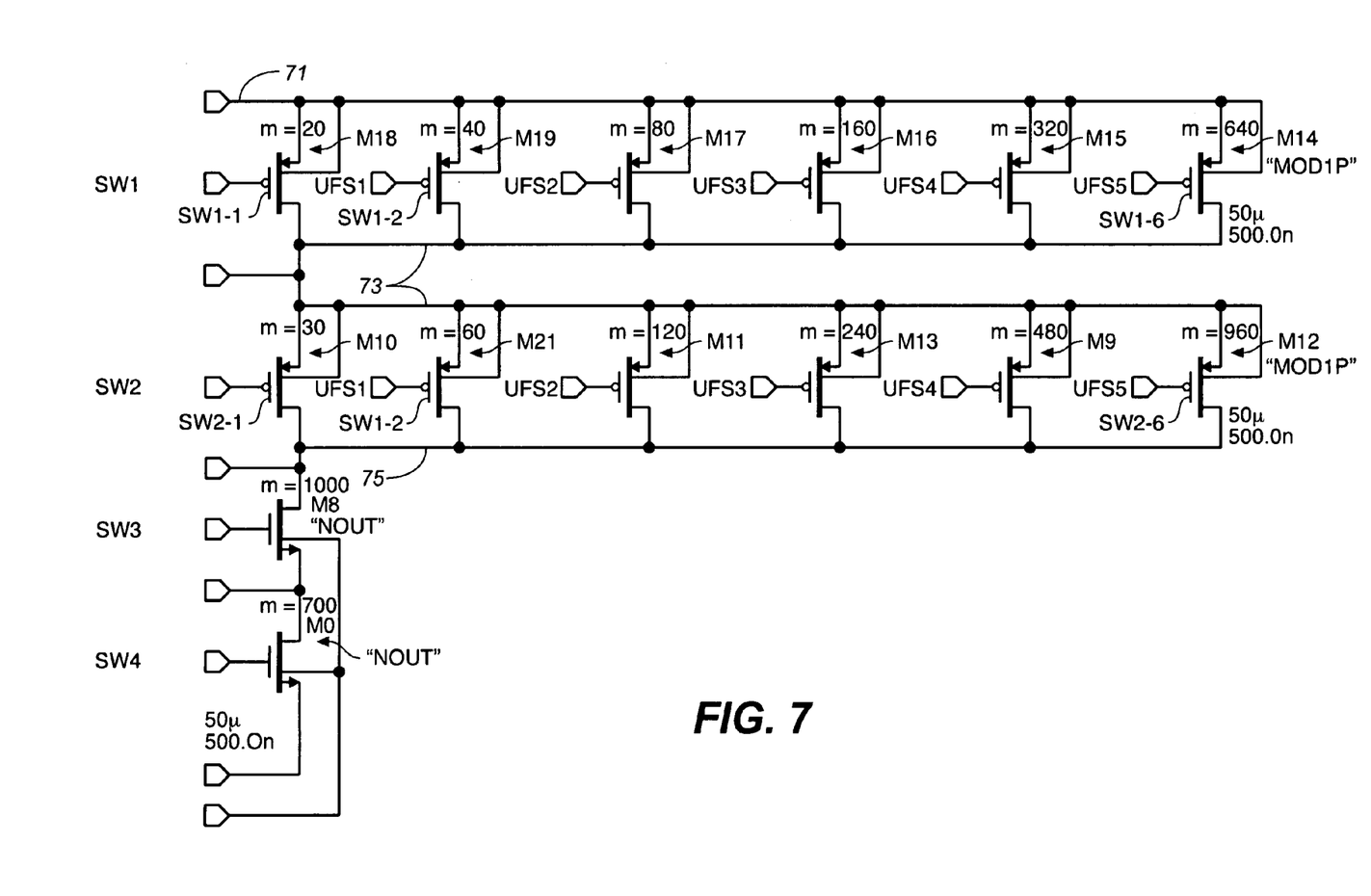
FIG. 7 illustrates a circuit diagram of a digital power control circuit according to embodiments of the invention.

FIG. 7 illustrates an embodiment, in which switch segments include switch-segment groups. In this embodiment switches SW1 and SW2 are segmented, and switches SW3 and SW4 are not segmented. In other embodiments, other switches or their combinations may be segmented.

SW1 is segmented into 6 switch-segments SW1-1 . . . SW1-6, and SW2 is segmented into 6 switch-segments as well, denoted as SW2-1 . . . SW2-6. A switch-segment can include switch-segment groups. In some embodiments, the switch-segment groups include similar individual switch-segments, wherein the numbers of switch-segments in the subsequently indexed switch-segment groups relate to each other as powers of two. As an example, switch-segment SW1-1 can be a switch-segment group, which contains 20 essentially identical MOS-FETs coupled in parallel between first shared rail 71 and second shared rail 73. In this embodiment switch-segment group SW1-2 contains 40 essentially identical MOS-FETs, switch-segment group SW1-3 contains 80 MOS-FETs, switch-segment group SW1-4 contains 160 MOS-FETs, switch-segment group SW1-5 contains 320 MOS-FETs and switch-segment group SW1-6 contains 640 MOS-FETs. In this embodiment the ratio of the numbers of MOS-FETs in the subsequent switch-segment groups relates to each other as increasing powers of 2. In general, in embodiments with m switch-segments and 20 MOST-FETs in switch-segment SW1-1, switch-segment SW1-$m$ contains $20*2^{(m-1)}$ MOS-FETs. In some embodiments the area of the MOS-FETs in switch-segment groups SW1-1 . . . SW1-6 can vary according to a binary series according to the fractions ½, ¼, ⅛, 1/16, 1/32, and 1/64. In other embodiments, these fractions can follow any other series.

In the present embodiment the number of MOS-FETs in the increasingly labeled switch-segment groups SW2-1 . . . SW2-6 are: 30, 60, 120, 240, 480, and 960. The number of subsequent switch-segment groups are again related to each other as increasing powers of 2.

In other embodiments switch-segment group SW1-1 can contain any number of MOST-FETs. In some embodiments switch-segment groups with increasing number of MOS-FETs are not arranged and indexed sequentially. In some embodiments the number of switch-segment groups relates to each other by some formula other than increasing powers of 2.

Switch-segments are controlled by the gate signal, generated by gate logic 63, being coupled to their gate. As shown, switch-segments SW1-1 . . . SW1-6 receive individual gate signals UFS1 . . . UFS6 (for "upper fractional switch") and switch segments SW2-1 . . . SW2-6 receive individual gate signals LFS1 . . . LFS6 (for "lower fractional switch") from gate logic 63.

In yet other embodiments, the switch segments are single MOS-FETs, but the size of higher-indexed MOS-FETs is increasing. Among these embodiments some have increasing size MOS-FETs, which are not indexed sequentially.

In some embodiments the sizes of the switch-segments are selected for the case of minimal headroom and the heaviest load. The extent of the current spike, the output ripple, and the dynamic loss are all proportional to the size of the switch. Therefore, embodiments utilizing several smaller switch-segments reduce the current spike, the output ripple, and the dynamic loss.

Referring again to FIG. 6, switch-segments SW1-1 . . . SW1-$m$ individually have at least two terminals. One terminal of each switch-segment SW1-1 . . . SW1-$m$ is coupled to a first shared rail 71, the other terminal of each switch-segment SW1-1 . . . SW1-$m$ is coupled to a second shared rail 73. First shared rail 71 includes first switch node 72, with an output node TOP, second shared rail 73 includes second switch node 74 with an output node CAP+. Switch-segments SW2-1 . . . SW2-$m$ individually have at least two terminals. One terminal of each switch-segment SW2-1 . . . SW2-$m$ is coupled to a second shared rail 73, the other terminal of each switch-segment SW2-1 . . . SW2-$m$ is coupled to a third shared rail 75. Third shared rail includes third switch node 76 with an output node MID. In other embodiments other switches are segmented. In these embodiments SW1 is coupled between first switch node 72 and second switch node 74 and SW2 is coupled between second switch node 74 and third switch node 76.

Third switch SW3 is not segmented in this embodiment. Third switch SW3 is coupled between third shared rail 75 or third switch node 76 and fourth switch node 78. Fourth switch node 78 has an output node CAP-. Fourth switch SW4 is coupled between fourth switch node 78 and fifth switch node 80 with an output node BOT. In other embodiments third switch SW3 and fourth switch SW4 can be segmented.

Flying capacitor C1 is coupled between second switch node 74 and fourth switch node 78. Output terminal 27, which provides output voltage V_out, is coupled to output node MID. Output terminal 27 is coupled to output capacitor C_out, and can be coupled to the load R_load. Finally, output terminal 27 is also coupled to voltage divider 49. In the present embodiment voltage divider 49 includes two resistors R1 and R2, but in other embodiments other voltage divider circuits can be employed. Feedback loop 33 is coupled to the node between resistors R1 and R2. Feedback loop 33 senses the [R1/(R1+R2)] fraction of output voltage V_out and feeds the sensed voltage back to A/D converter 52.

In operation, some embodiments of power control circuit 2 function as follows. Power control circuit 2 generates an output voltage V_out essentially equal to some predefined voltage. However, output voltage V_out may deviate from this predefined voltage because, for example, the supply voltage V_DD or the load varies. To compensate for such voltage deviations, a fraction of output voltage V_out is generated by voltage divider 49 and fed back to A/D converter 52 as feedback voltage V_fb by feedback loop 33. A/D converter 52 senses V_fb and compares it to reference voltage V_ref. A/D converter 52 generates error voltage V_err representing which of V_fb and V_ref is greater. Error voltage V_err is coupled into encoder 55. Encoder 55 generates an n-bit digital error signal V_err,d from the V_err error voltage. V_err,d signals whether V_fb or V_ref is greater.

In some embodiments the accuracy of output voltage V_out is about ±3%. This sets the range of feedback voltage V_fb. If reference voltage V_ref is 1V, feedback voltage V_fb stays in the ±20 mV (or ±2%) range. If feedback voltage V_fb is 20 mV higher than reference voltage V_ref, the m-bit gate signal is set to "Low", which turns off switch-segments SW1-1 . . . SW1-$m$. If feedback voltage V_fb is 20 mV lower than reference voltage V_ref, the m-bit gate signal is set to "High", which turns on switch-segments SW1-1 . . . SW1-$m$. The comparator used in A/D converter 52 usually has about 2 mV of input offset voltage. If the Least Significant Bit (LSB) of A/D converter 52 is set to be 3 mV, then a 4-bit A/D converter is enough to cover the range of ±20 mV.

The V_err,d digital error signal is coupled into add-subtractor 59. Further, during a cycle the preceding cycle's m-bit gate signal, in other words a sample-and-hold gate signal, is also coupled into add-subtractor 59 through a link.

In response, add-subtractor 59 generates the add-subtract signal of the present cycle by adding the present-cycle's n-bit digital error signal V_err,d to the sample-and-hold gate signal of the previous cycle.

The m-bit add-subtract signal of add-subtractor 59 is coupled into gate logic 63. An oscillator signal of oscillator 67 is also coupled into gate logic 63. Oscillator 67 provides cyclic clock signals to synchronize the operation of the various blocks of power control circuit 2. Gate logic 63 generates a gate signal according to the cycles of oscillator 67. The gate signal is generated according to the add-subtract signal, which is determined by whether the feedback voltage V_fb or the reference voltage V_ref is greater as well as by the sample-and-hold signal, as described before. Depending on which voltage is greater, the gate signal increases or decreases the number of ON switch-segments. The greater the difference between the voltages V_fb or V_ref, the greater number of switch-segments will be added to or subtracted from the group of switch-segments already ON. In some embodiments the greater the voltage difference, the higher indexed switch-segments will be added to or subtracted from the group of switch-segments already ON.

The gate signal is coupled into switch array 15. The gate signal controls the ON-OFF states of switch-segments SW1-1 . . . SW1-*m* and SW2-1 . . . SW2-*m*. In embodiments, where switch-segments SW1-1 . . . SW1-*m* and SW2-1 . . . SW2-*m* are MOS-FETs, the gate signal controls the gate voltage of the MOS-FETs. A change in the gate voltage translates to a change in the ON-OFF state of the MOS-FETs. Switch-segments SW1-1 . . . SW1-*m* are coupled in parallel to each other. The gate signal controls which switch-segments should be switched ON, thereby controlling the fraction of the supply voltage V_DD that generates output voltage V_out at output terminal 27. Hence, the gate signal varying the number of ON switch-segments controls the output voltage V_out.

Next, the operation of switch array 15 will be described in relation to FIGS. 8A–B. The operation of the whole power control circuit 2 will be subsequently described in relation to FIG. 6.

Figure 8A:
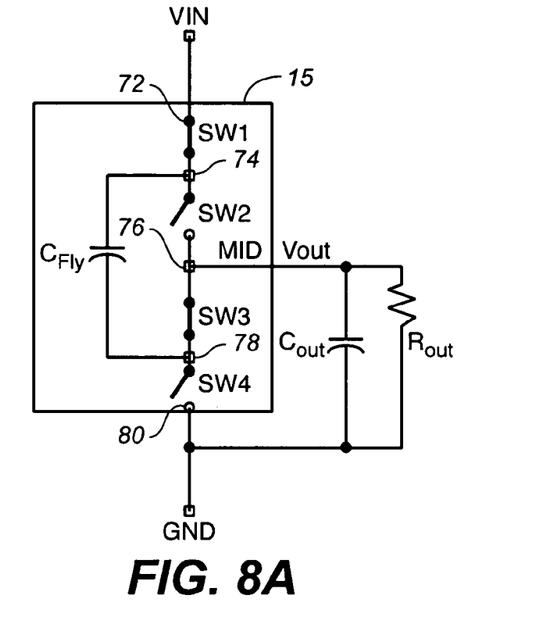
FIGS. 8A and B illustrate two phases of the operation of a switch array, according to embodiments of the invention.
Figure 8B:
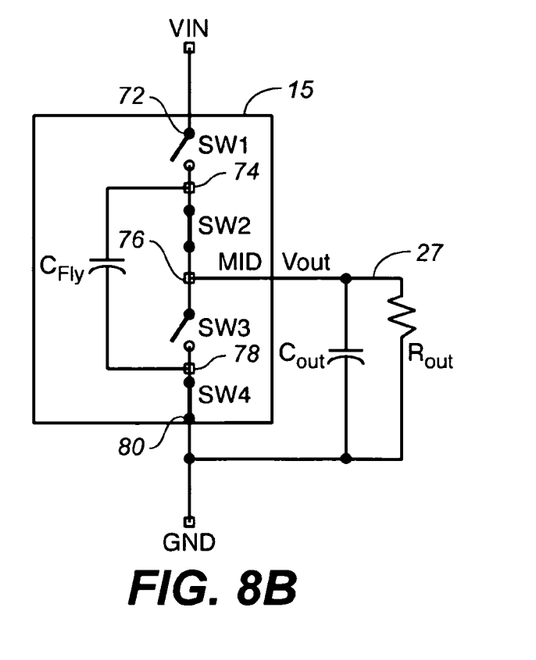

FIGS. 8A–B illustrate an example of the operation of switch array 15. The operation is first explained on a simplified architecture where the switches are not segmented. Fly capacitor C1 will be also referred to as $C_{Fly}$.

In analogy with earlier embodiments, in switch array 15 first switch SW1 is coupled between first switch node 72 and second switch node 74, second switch SW2 is coupled between second switch node 74 and third switch node 76, third switch SW3 is coupled between third switch node 76 and fourth switch node 78, and fourth switch SW4 is coupled between fourth switch node 78 and fifth switch node 80. Fifth switch node 80 is coupled to the ground.

Flying capacitor $C_{Fly}$ is coupled between second switch node 74 and fourth switch node 78. Output capacitor C_out is coupled between third switch node 76 and fifth switch node 80. Output terminal 27 and load resistor R_load are coupled between third switch node 76 and the ground.

FIG. 8A illustrates the charging phase or step of the operation of switch array 15. In this charging phase switches SW1 and SW3 are ON, whereas switches SW2 and SW4 are OFF. Flying capacitor $C_{Fly}$ is in electrical connection with output capacitor C_out and load resistor R_out. In this charging phase supply voltage V_DD is charging up flying capacitor $C_{Fly}$.

FIG. 8B illustrates the pumping phase or step. In this pumping phase switches SW1 and SW3 are OFF, whereas switches SW2 and SW4 are ON. Therefore, capacitors $C_{Fly}$ and C_out are decoupled from the voltage supply. In this phase the flying capacitor $C_{Fly}$ discharges by transferring its charges to output capacitor C_out. In embodiments, where flying capacitor $C_{Fly}$ is approximately equal to C_out, the two capacitors both discharge across load resistor R_load. In this pumping phase the voltage of the capacitors starts decreasing from its initial value of V_out of about half of V_DD. However, if the cycle of oscillator 67 is sufficiently shorter than the time constant of the RC circuit formed from C_out and R_load, the voltage decay can be kept sufficiently small, reducing the ripple of the output voltage V_out to a desired level.

In an exemplary case, switch SW1 turns ON in phase 1 (the charging phase) of cycle i and switch SW2 turns on in phase 2 (the pumping phase) of the same cycle i. Before the end of phase 1 the m-bit gate signal of switch SW1 is sampled and held until phase 2. The sampled m-bit gate signal of switch SW1 is coupled into m-bit add-subtractor 59 by a link. The n-bit digital error signal V_err,d from A/D converter 52 is also coupled into m-bit add-subtractor 59. In m-bit add-subtractor 59 the n-bit digital error signal is added/subtracted from the m-bit gate signal of switch SW1. The resulting m-bit signal generates the renewed m-bit gate signal for switch SW1 through gate logic 63, and will be used in phase 1 of cycle (i+1). The gate signal of switch SW1 is sampled shortly before the end of phase 1 of cycle i, processed during phase 2 of cycle i and is used in phase 1 of cycle (i+1). The gate signal of switch SW2 is sampled before the end of phase 2 of cycle i, processed in phase 1 of cycle (i+1) and is used in phase 2 of cycle (i+1).

The n-bit digital error signal generated by A/D converter 52 has one sign bit. The high or low of the sign bit determines that the other (n-1) bits of the digital error signal are added to or subtracted from the sample-and-hold m-bit gate signal.

Typically, n is less than or equal to m−1. In some cases at no load the bits of the m-bit gate signal are all 0 and at full load the bits of the m-bit signal are all 1. In some embodiments, where n=m-1, the (m-1) bit digital error signal has 1 sign bit, which is high in this case. This high sign bit causes the remaining (m-2) bits of the digital error signal to be added to the m-bit gate signal. It takes 4 clock cycles to make the m-bit gate signal to change from all 0 to all 1.

Finally, additional aspects of the operation of power control circuit 2 will be described with reference to the digital embodiment of FIG. 6. Where possible, comparative reference will be made to the analog circuit described in FIG. 4.

During the operation of the analog circuit of FIG. 4, the charge flow is controlled only in the charging phase. In the digital embodiment of FIG. 6, the charge flow is controlled in both the charging phase as well as the pumping phase.

Further, during the operation of the analog circuit of FIG. 4, flying capacitor C1 may discharge while at a voltage much higher than the output voltage V_out. Such voltage differences typically generate a high level of noise. In the digital embodiment of FIG. 6, flying capacitor C1 is only partially connected to the output voltage V_out. Therefore, the discharging of flying capacitor C1 typically generates a low level of noise.

In addition, the analog circuit of FIG. 4 has poor line and load transient response due to limited loop bandwidth. Also, the dynamic losses are high as the entire switches of switch array 15 are turned on and off.

In the digital embodiments of FIG. 6, the line and load transient responses are fast due to the high bandwidth of the digital control loop. Also, the dynamic losses are low because only some of the switch-segments are turned on.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power control circuit comprising:
a switch array comprising:
switches;
a flying capacitor; and
an output voltage terminal, capable of providing an output voltage;
a feedback loop, coupled to the output voltage terminal; and
a voltage regulator block:
comprising an Analog-to-Digital converter, configured to output a digital signal of more than one bit, the digital signal representing a difference of the output voltage and a reference voltage;
configured to regulate the output voltage; and
coupled to the feedback loop and to the switch array, wherein
at least one of the switches is a segmented switch, comprising more than one switch-segment.

2. The control circuit of claim 1, wherein:
a first switch is coupled between a first switch node and a second switch node;
a second switch is coupled between the second switch node and a third switch node;
a third switch is coupled between the third switch node and a fourth switch node; and
a fourth switch is coupled between the fourth switch node and a fifth switch node, wherein
the first and third switches are capable of assuming a first switching state, and the second and fourth switches are capable of assuming a second switching state, wherein the first and second switching states are opposite.

3. The control circuit of claim 2, wherein the flying capacitor is coupled between the second switch node and the fourth switch node.

4. The control circuit of claim 2, comprising:
an output voltage terminal, coupled to one of the first, third, and fifth switch nodes; and
an output capacitor, coupled to the output voltage terminal.

5. The control circuit of claim 1, wherein
the voltage regulator block is a digital voltage regulator block; and
the Analog-to-Digital Converter is configured to control the switches by one of a direct signal and a digitally processed signal.

6. The control circuit of claim 5, wherein
the digital voltage regulator block is configured to regulate at least one of the switch-segments of at least one segmented switch.

7. The control circuit of claim 5, the digital voltage regulator block comprising:
an encoder, coupled to the output of the Analog-to-Digital converter, configured to generate a digital error signal from the difference of a reference voltage and a feedback voltage, provided by the feedback loop.

8. The control circuit of claim 7, the digital voltage regulator block comprising
an add-subtractor, configured to receive the digital error signal from the encoder.

9. The control circuit of claim 8, wherein
the add-subtractor is configured to receive a sample-and-hold gate signal, and to perform an arithmetic operation on the received digital error signal and the sample-and-hold gate signal.

10. The control circuit of claim 9, the digital voltage regulator block comprising:
a gate logic, configured:
to receive the signal generated by the add-subtractor;
to generate a gate control signal in accordance with the signal received from the add-subtractor; and
to couple the generated gate control signal into a segmented switch.

11. The control circuit of claim 10, wherein
the switch-segments have open and closed switching states; and
the number of closed switch-segments is controlled by the received gate control signal.

12. The control circuit of claim 10, comprising
a link between at least one of the segmented switches and the add-subtractor, the link configured to feed back in an oscillator cycle the gate-signal of the previous oscillator cycle to the add-subtractor, thereby generating a sample-and-hold signal.

13. The control circuit of claim 1, wherein
the control circuit is configured to operate at a constant frequency.

14. The power control circuit of claim 1, wherein
a plurality of switch-segments are coupled in parallel; and
all the parallel-coupled switch-segments may be operable to be simultaneously in their closed states during regular operations.

15. The control circuit of claim 14, wherein
the switch-segments of a segmented switch comprise first and second terminals, wherein
the first terminals of the switch-segments are coupled to a first shared rail; and
the second terminals of the switch-segments are coupled to a second shared rail.

16. The control circuit of claim 15, wherein
the switch-segments have open and closed switching states, wherein
the conductance between the first and the second shared rail increases when the number of closed switch-segments between the first shared rail and the second shared rail increases.

17. The control circuit of claim 14, wherein
the switch-segments of a segmented switch are organized into switch-segment groups, wherein
the switch-segment groups can be labeled so that the number of switch-segments in the switch-segment groups are related to each other as increasing powers of two.

18. The control circuit of claim 14, wherein
the switch-segments comprise transistors, wherein the transistors are selected from the group of bipolar junction transistors and MOS-FETs.

19. The power control circuit of claim 1, wherein
an output of the voltage regulator block does not depend on an input voltage.

20. The power control circuit of claim 1, wherein
an output voltage of the voltage regulator block depends only on a difference between the output voltage and the reference voltage.

21. A power control circuit, comprising:
a voltage supply;
a switch array, configured to receive a supply voltage from the voltage supply, comprising:
switches;
at least one capacitor; and
an output voltage terminal;
a feedback loop, coupled to the output voltage terminal; and
a digital voltage regulator block:
comprising an Analog-to-Digital converter, configured to output a digital signal of more than one bit, the digital signal representing a difference of an output voltage and a reference voltage;
configured to regulate the output voltage by digital regulating signals; and
coupled to the feedback loop, to the voltage supply, and to the switch array.

22. The control circuit of claim 21, the switches comprising
segmented switches, wherein
the digital voltage regulator block regulates the segmented switches.

23. A power control circuit, comprising:
a switch array comprising:
switches;
a flying capacitor; and
an output voltage terminal, capable of providing an output voltage;
a feedback loop, coupled to the output voltage terminal; and
a voltage regulator block:
comprising an Analog-to-Digital converter, configured to output a digital signal of more than one bit, the digital signal representing a difference of the output voltage and a reference voltage;
configured to regulate the output voltage; and
coupled to the feedback loop and to the switch array, wherein
the power control circuit is operable in charging and pumping phases; and
a ripple of the output voltage is controlled both in the charging and the pumping phase.

24. A power control circuit, comprising:
a voltage supply;
a switch array, configured to receive a supply voltage from the voltage supply, comprising:
switches;
at least one capacitor; and
an output voltage terminal;
a feedback loop, coupled to the output voltage terminal; and
a voltage regulator block:
comprising an Analog-to-Digital converter, configured to output a digital signal of more than one bit, the digital signal representing a difference of an output voltage and a reference voltage;
configured to regulate the output voltage; and
coupled to the feedback loop, to the voltage supply, and to the switch array, wherein
the power control circuit does not include a pass transistor.

25. A method of controlling an output voltage of a power control circuit, the method comprising:
generating an output voltage at an output voltage terminal of the power control circuit;
generating a feedback voltage by feeding the output voltage back to a voltage regulator block by a feedback loop; and
regulating the output voltage according to the feedback voltage by the voltage regulator block controlling at least one segmented switch of a switch array, wherein
the voltage regulator block comprises an Analog-to-Digital converter, configured to output a digital signal of more than one bit, the digital signal representing a difference of the output voltage and a reference voltage.

26. The method of claim 25, wherein regulating the output voltage comprises
generating a digital error signal by an Analog-to-Digital converter and a coupled encoder from the difference of a reference voltage and the feedback voltage.

27. The method of claim 26, wherein regulating the output voltage comprises
generating an add-subtractor signal by performing an arithmetic operation by an add-subtractor on the digital error signal and a sample-and-hold gate signal.

28. The method of claim 27, wherein regulating the output voltage comprises:
generating a gate control signal by a gate logic in accordance with the add-subtractor signal; and
coupling the gate control signal into the switch array.

29. The method of claim 28, wherein regulating the output voltage comprises
controlling the number of closed switch-segments of the switch array by the gate control signal, wherein
the switch-segments have open and closed switching states.

30. A method of controlling an output voltage of a power control circuit, the method comprising:
providing a supply voltage by a voltage supply to a switch array;
generating an output voltage at an output voltage terminal;
generating a feedback voltage by feeding the output voltage back to a digital voltage regulator block by a feedback loop; and
regulating the output voltage by the digital voltage regulator block digitally controlling at least one switch of the switch array according to the feedback voltage, wherein
the voltage regulator block comprises an Analog-to-Digital converter, configured to output a digital signal of more than one bit, the digital signal representing a difference of the output voltage and a reference voltage.

31. The method of claim 30, wherein at least one of the switches comprises at least one segmented switch.

32. A method of controlling an output voltage of a power control circuit, the method comprising:
providing a power control circuit, comprising:
  a switch array comprising:
    switches;
    a flying capacitor; and
    an output voltage terminal, capable of providing an output voltage;
  a feedback loop, coupled to the output voltage terminal; and
  a voltage regulator block:
    comprising an Analog-to-Digital converter, configured to output a digital signal of more than one bit, the digital signal representing a difference of the output voltage and a reference voltage;
    configured to regulate the output voltage; and
    coupled to the feedback loop and to the switch array;
operating the power control circuit in charging and pumping phases; and
controlling a ripple of the output voltage both in the charging and the pumping phase.

* * * * *